(12) United States Patent
Lee et al.

(10) Patent No.: US 7,597,981 B2
(45) Date of Patent: Oct. 6, 2009

(54) COMPOSITE ELECTROLYTE MEMBRANE WITH NANOSCOPIC DENDRIMERS AND METHOD OF PREPARING SAME

(75) Inventors: Jong Hyun Lee, Seongnam-si (KR); Hwan Soo Shin, Anyang-si (KR); Hee Woo Rhee, Seoul (KR); Young Taek Kim, Seoul (KR); Min Kyu Song, Suwon-si (KR); Min Sung Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 583 days.

(21) Appl. No.: 11/291,868

(22) Filed: Nov. 30, 2005

(65) Prior Publication Data

US 2006/0116479 A1 Jun. 1, 2006

(30) Foreign Application Priority Data

Nov. 30, 2004 (KR) ...................... 10-2004-0099337

(51) Int. Cl.
*H01M 8/10* (2006.01)
*H01M 6/18* (2006.01)
*B01J 49/00* (2006.01)

(52) U.S. Cl. ............................ 429/33; 429/46; 429/188; 429/304; 429/306; 429/309; 429/314; 429/315; 429/316; 429/317; 210/500.1; 210/500.27

(58) Field of Classification Search .................. 429/33, 429/46, 188, 304, 306, 309, 314, 315, 316, 429/317; 210/500.1, 500.27
See application file for complete search history.

(56) References Cited

U.S. PATENT DOCUMENTS 7,195,835 B2 * 3/2007 Colombo et al. .............. 429/33

\* cited by examiner

*Primary Examiner*—Ana L Woodward
(74) *Attorney, Agent, or Firm*—Morgan, Lewis & Bockius LLP

(57) ABSTRACT

The present invention relates to a composite electrolyte membrane for fuel cells that has high proton conductivity and low fuel permeability even under low humidity conditions and at elevated temperatures. The membrane, comprising a cation exchange resin and acid-treated dendrimers, has great utility in large and medium fuel cells for applications in household appliances, electric vehicles, etc.

6 Claims, 6 Drawing Sheets

COMPOSITE ELECTROLYTE MEMBRANE WITH NANOSCOPIC DENDRIMERS AND METHOD OF PREPARING SAME

CROSS REFERENCE TO RELATED APPLICATION

This application claims priority of Korean Patent Application No. 10-2004-0099337, filed on Nov. 30, 2004 with the Korean Intellectual Property Office, the disclosure of which is fully incorporated herein by reference.

FIELD OF THE INVENTION

The present invention relates to composite membranes with nanoscopic dendrimers and methods of preparing same. The composite membranes are suitable for use in electrochemical applications, particularly as electrolyte membranes in fuel cells.

BACKGROUND OF THE INVENTION

Spurred on by increasing oil prices and growing concerns over environmental pollution, the use of fuel cells has sparked global interest as an alternative to fossil fuel and combustion technologies. Fuel cells are attractive for a number of reasons, e.g. low pollution, high energy efficiency, fuel flexibility, high quality power output, quick response to load fluctuations, excellent heat recovery characteristics, quiet operation, etc. Their high energy efficiency and low pollution partly derive from the use of a clean fuel source, e.g. hydrogen, methanol, etc.

There are many different types of fuel cells. Of particular promise in a broad range of applications is the polymer electrolyte membrane fuel cell (PEMFC), otherwise known as proton exchange membrane fuel cell. In a PEMFC as illustrated in FIG. 1, a layer of ion-conducting polymer electrolyte membrane 11 is sandwiched between a positive electrode, a cathode, and a negative electrode, an anode. Typically, the polymer electrolyte membrane measures from 20-200 μm in thickness. Each electrode lies adjacent to a catalyst layer, represented by 12 and 13; these catalyst layers speed up the oxidation and reduction of gases, e.g. oxygen and hydrogen, on both sides of the electrolyte membrane. Supporting layers 14 and 15, lying adjacent to catalyst layers 12 and 13, ensure effective diffusion of each reactant gas to the catalyst and even distribution of gases across the electrode surfaces.

A pair of gas-impermeable, bipolar plates 16, adjacent to the outer surface of supporting layers 14 and 15, serves as a gas flow field and current collector. To provide a gas flow field, plates 16 contain groove(s) along which reactant gases can travel after their introduction into the fuel cell. Each plate also acts as a current collector such that electrons produced by the oxidation hydrogen can be conducted 1) through the anode, through the adjacent supporting layer 14, and through anode plate 16, 2) travel through an external circuit, and 3) re-enter the fuel cell at the cathode plate 16.

The mechanism by which a PEMFC generates electricity is as follows. During fuel cell operation, a fuel such as hydrogen gas ($H_2$) is distributed over the anode and reacted with catalyst layer 12 to generate protons and electrons. This oxidation reaction is represented by Chemical Equation 1 below.

$2H_2 \rightarrow 4H^+ + 4e^-$ <Chemical Equation 1>

The hydrogen ions, or protons, then penetrate the polymer electrolyte membrane 11 and travel towards the cathode while the electrons are conducted through an external circuit to the anode. At the cathode, an oxidant such as oxygen ($O_2$) combines with electrons from the anode and undergoes reduction to oxygen ions ($O^{2-}$) and reacts with the protons to form water, heat, and electricity. The above reactions are illustrated in Chemical Equation 2 below.

$O_2 + 4e^- \rightarrow 2O^{2-}$ $2O^{2-} + 4H^+ \rightarrow 2H_2O$ <Chemical Equation 2>

The polymer electrolyte membrane 11, which can be a cation exchange membrane, serves several important functions in a PEMFC. Namely, it functions as an insulator between the anode and cathode, an ion conductor between anode and cathode, and a separator for the fuel and oxidant. A polymer electrolyte for fuel cells should therefore have (a) low resistance to protons and electrons, (b) sustained selective permeability to hydrogen over a wide temperature range; (c) electrochemical stability; (d) enhanced conductivity; (e) ability to maintain separation of reaction products; and (f) robust chemical, mechanical, and dimensional properties suitable for a stack environment.

A leading polymer electrolyte commonly used in fuel cells and other applications is known by the trade name of NAFION (Dupont Co. Ltd.). NAFION is a perfluoronated membrane that is fabricated by melting tetrafluoroethylene and perfluorovinyl ethersulfonyl fluoride together, shaping the mixture, and then hydrolyzing the metal to yield the ionic sulfonate form. Its sulfonic acid group serves as an ion exchange group and the copolymer of tetrafluoroethylene and perfluorovinylether acts as a base. NAFION has high proton conductivity, approximately 0.1 S/cm at 25° C., under hydrated conditions, in which the amount of sulfonyl group ($-SO_3H$) that dissociates is more than 20 wt % of the total weight of the polymer. Among single polymers, NAFION is also considered the most stable with respect to its mechanical, chemical, electrochemical properties. While NAFION has many good qualities in the context of PEM cells, its limitations have presented a number of problems.

For instance, NAFION is susceptible to dehydration resistance. Since NAFION transports protons with the aid of water, its proton conductivity suffers when the membrane is not sufficiently hydrated. If fuel cell operation were feasible under low humidity conditions, the weight and volume of the humidifier in fuel cell designs can be reduced to enhance total cell efficiency.

NAFION is also limited to operating temperatures below 100° C. since higher temperatures can result in low proton conductivity, dehydration resistance, and degradation of the membrane. There is however a great benefit to developing a fuel cell that can operate at higher temperatures. High operating temperatures can accelerate reactions in the fuel cell, thereby promoting system efficiency, and avoid or minimize carbon monoxide poisoning of the platinum catalyst(s). Therefore, the ability to operate at high temperatures is invaluable for the development of a medium or large PEMFC usable in household appliances, electric vehicles, and other applications.

To overcome the above technical limitations, efforts have been made on developing a variety of alternative membranes, none of which has demonstrated sufficient advantages to replace NAFION as the membrane of choice. In an attempt to overcome NAFION's limitations at low humidity and high temperatures, Staiti et. al. and Tazi et. al. impregnated NAFION with phosphotungstic acid and silicotungstic acid/thiophene, respectively. See, P. Staiti (2001) *Materials Letters* 47: 241-246, and B. Tazi et al. (2000) *Electrochimica Acta* 45: 4329-4339. In this manner, Staiti et. al. and Tazi et.

al. were able to increase proton conductivity and hydration levels at temperatures approaching 120° C. by using these hydrophilic heteropolyacid compounds to prevent evaporation of moisture. However, this method has its drawback; the soluble additives tend to leach out of the electrolyte membrane structure during fuel cell operation, which thereby undercuts their utility.

Although water is a byproduct of fuel cell reactions and indispensable to the function of cation exchange membranes, the dependence on water to conduct protons in the electrolyte membrane has its disadvantages. Since water is a Brönstead-Lowry base with a high dielectric constant, sulfonyl groups (—$SO_3H$) tend to dissociate quite readily from the NAFION membrane. As such, the use of an organic solvent of low volatility as a proton acceptor within the electrolyte membrane has been considered. Other electrolyte membranes employing phosphoric acid, imidazole, butyl methyl imidazolium triflate, or butyl methyl imidazolium tetrafluoroborate have also been contemplated, each with its own inherent disadvantages (R. Savinell, et al., *J. Electrochem. Soc.,* 141, L46 (1994), K. D. Kreuer, A. Fuchs, M. Ise, M. Sapeth, *J. Mater. Electrochem. Acta,* 43, 1281 (1998)).

Other strategies to overcome the moisture dependency are directed to an anhydrous method of conducting protons across the electrolyte membrane. To this end, solid acids such as cesium hydrogen sulfate ($CsHSO_4$), or zirconium hydrogen phosphate ($Zr(HPO_4)_2$) have been added to electrolyte membranes. See S. M. Haile, D. A. Yoysen, C. R. I. Chisolm, R. B. Merle (2001) *Nature* 410: 910.

There are several problems associated with the above technique. First, these large particles of high-density inorganic additive become non-uniformly dispersed on the NAFION membrane as the NAFION solution, in which $CsHSO_4$ or $Zr(HPO_4)_2$ is suspended, dries. Second, such additives do not adhere well to the polymer matrix and their addition has the effect of weakening the membrane. See U.S. Pat. No. 5,919,583. Additionally, the instability of these inorganic additives makes them poorly suited to the role of an ionic conductor in the context of fuel cells. For example, the acid will dissociate into $Zr^{4+}$ ions which find their way to the hydrophilic domain or surface domain of a hydrated NAFION membrane, leaving only about 20 wt % of intact $Zr(HPO_4)_2$ on the membrane.

In light of the above, there is a need in the art for an electrolyte membrane that has good ionic conductivity even at elevated temperatures, the ability to maintain separation of reaction products; and robust chemical, mechanical, and dimensional properties suitable for a stack environment.

The present invention provides a way to overcome the aforementioned problems by uniformly dispersing nanoscopic dendrimers on an acid-treated surface of the hydrophilic domain of cation exchange polymer. An improved electrolyte membrane that exhibits high ionic conductivity and low fuel permeability even at low humidity and high temperatures is thereby obtained.

SUMMARY OF THE INVENTION

It is an object of the invention to provide a composite electrolyte membrane comprising a cation exchange resin and at least one type of acid-treated dendrimer.

It is another object of the invention to provide a method of fabricating a composite electrolyte membrane by: (a) dissolving a cation exchange resin in an organic solvent to prepare a polymer solution; (b) adding an acid-treated dendrimer to the polymer solution; and (c) mixing the polymer solution and the dendrimer by ultrasonic means.

These and other objects, features, and advantages of the invention will be apparent to those of skill in the art based on this disclosure in conjunction with the accompanying drawings.

DETAILED DESCRIPTION OF THE PREFERRED EMBODIMENT

Figure 1:
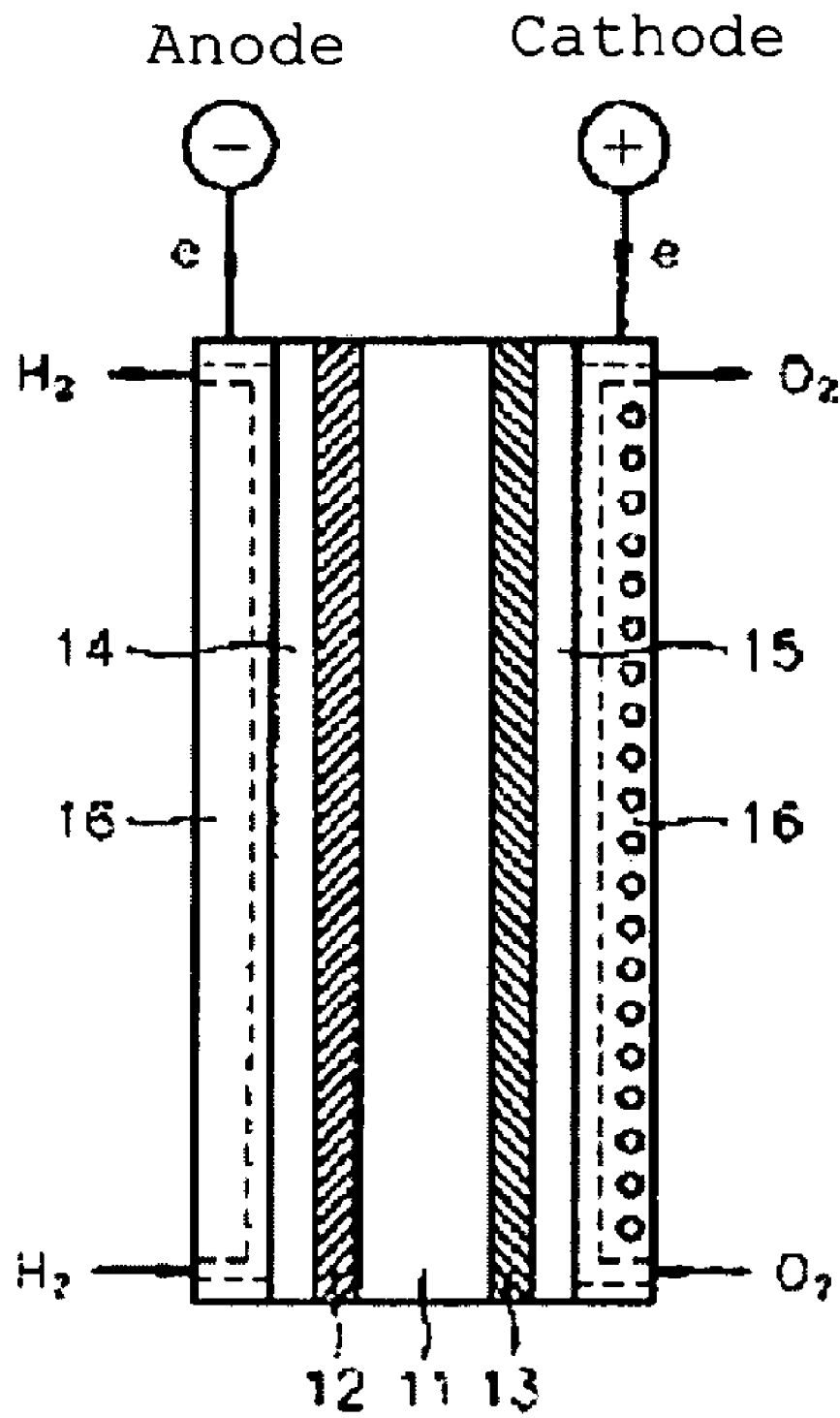
FIG. 1 depicts a cross-sectional view of a single conventional polymer electrolyte fuel cell.
Figure 2A:
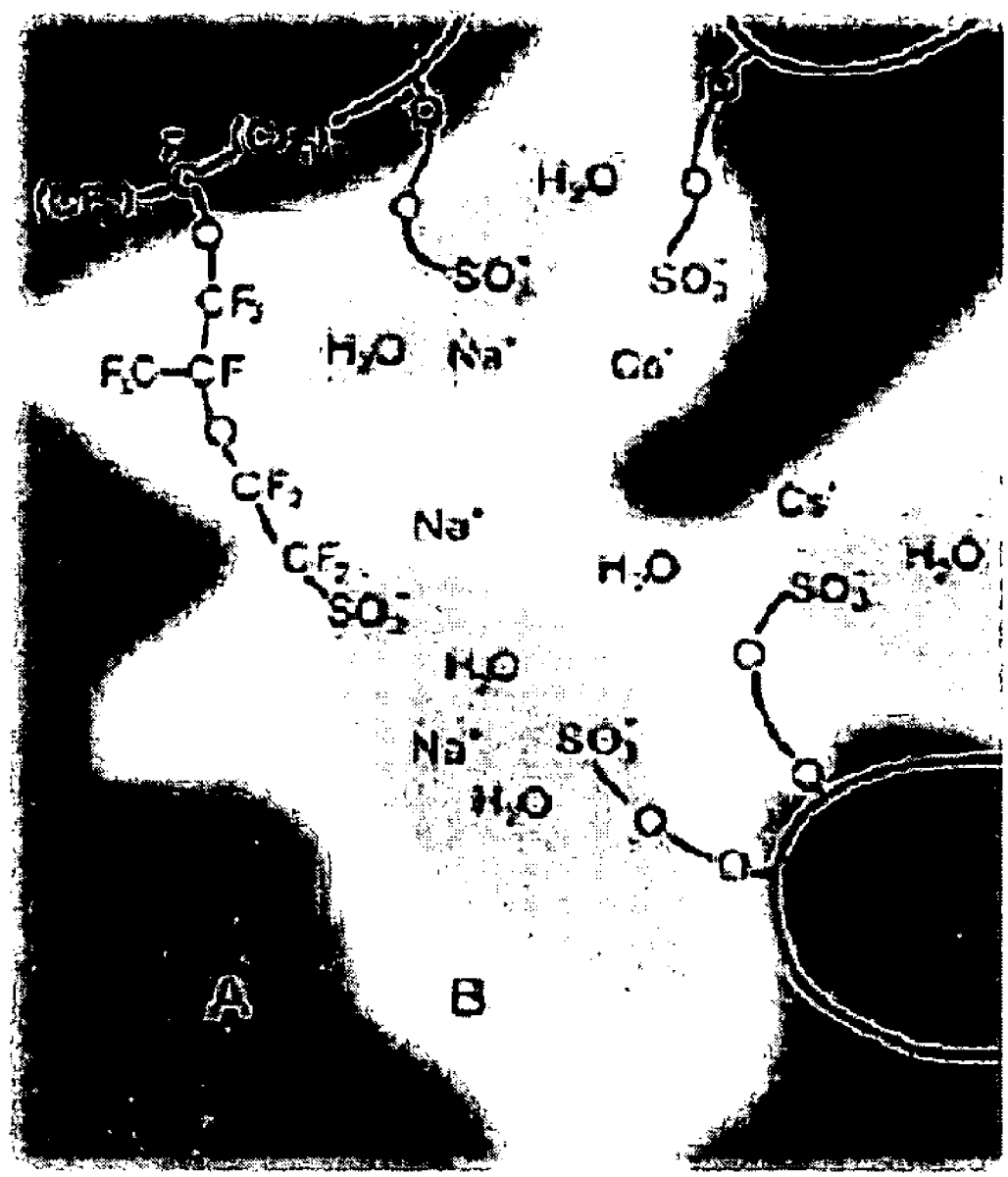
FIG. 2A is a schematic of a NAFION molecule, wherein hydrophobic domain of the polymer matrix has been labeled A and the hydrophilic pore of the matrix labeled B.
Figure 2B:
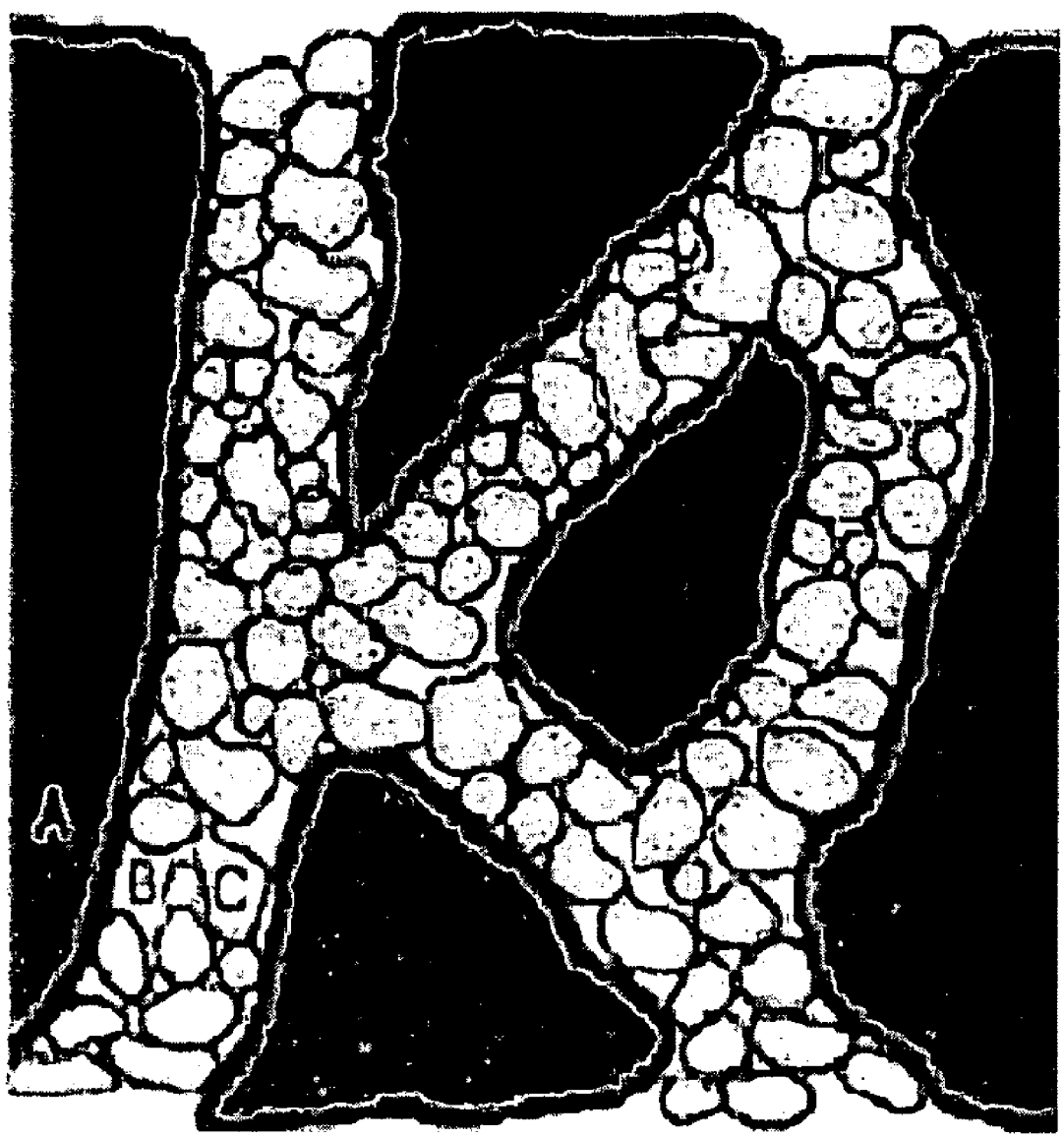
FIG. 2B depicts the NAFION/dendrimer composite electrolyte membrane permeated by dendrimer, wherein the hydrophobic domain of the matrix has been labeled A, the hydrophilic pore of the matrix labeled B, and the dendrimer labeled C.

In the present invention, an acid is added to the terminal groups of a nanoscopic molecule, e.g. dendrimer, which is in turn absorbed onto hydrophilic regions of a cation exchange resin, i.e. polymer matrix, so as to modify its mechanical properties. In this manner, adherence of the acid additive to the polymer matrix and dispersion of the inorganic acid additive over the polymer matrix is improved. The interface interaction between the inorganic additives, which can be increased to more than 30 wt % with the aid of the dendrimer, forms an ion conductive body. The electrolyte membrane thereby produced has improved ion conductivity and low fuel permeability even in low-humidity conditions and/or at elevated temperatures. The membrane's high operating temperature and tolerance for lower humidity is excellent for applications in medium or large PEMFC for household appliances, electric vehicles, etc. and greatly reduces the prior restraint on fuel cell design from humidifier unit(s) that kept conditions within tolerable levels for conventional electrolyte membranes. The method of the present invention is also cost-effective since less ion exchange resin/material is required to fabricate the thin film electrolyte membrane.

The present invention relates to a composite electrolyte membrane with nanoscopic dendrimers and methods for preparing same. The composite electrolyte membrane comprises a cation exchange resin or polymer and a dendrimer.

Preferred cation exchange resins include polymers. Preferred polymers include compound(s) having a poly tetrafluoroethylene (PTFE) backbone and at least one functionality selected from the group comprising sulfonic acid, carboxylic acid, phosphoric acid, phosphonyl acid and derivatives thereof. The cation exchange resin selected can be composed of a single compound with one or more of these functionalities or a combination of the same or different compound(s). Typically, the composite electrolyte is comprised of about 100 weight parts of cation exchange resin. The appropriate range of cation exchange resin to be employed would not vary by more than 5%. The precise amount of cation exchange resin can be varied accordingly by one of skill in the art to achieve the objection of the present invention.

A number of suitable cation exchange resins are commercially available. Some examples include NAFION (Dupont Co. Ltd.), Flemion (Asahi Glass KK Co. Ltd), and Aciplex (Asahi Chemicals Co. Ltd.). NAFION, as depicted by Formula 1 below, is a preferred choice and essentially acts as a multiplicity of proton channels. It acts like a typical acid solution and forms a micelle-like structure upon hydration of its sulfonic acid group(s) at the chain terminus.

<Formula 1>

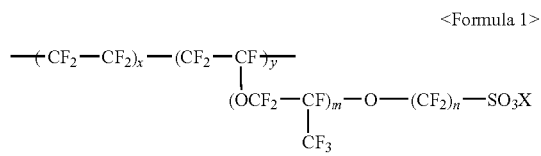

wherein, X is H, Li, Na, K or $NR_1R_2R_3R_4$; $R_1$, $R_2$, $R_3$ and $R_4$ are H, $CH_3$, or $C_2H_5$ independently; m is 1-3; n is 2; x is 5-13.5; and y is 700-1,500.

The cation exchange resin serves various functions. In particular, they facilitate the transfer of protons through the composite electrolyte membrane and lend structural integrity or stability to the membrane by lessening the impact of dimensional fluctuations caused by electrochemical cell temperature variations and/or variations in membrane water content.

With respect to the other component of the present invention, dendrimers are large synthetic molecules with highly branched three-dimensional structures that become more densely packed as they extend out to the periphery. As used herein, the term "dendrimer" also includes hyperbranched structures. Dendrimers have three major architectural components: core, branches, and end groups. These molecules are produced through a series of repetitive steps starting with a central initiator core. Each subsequent growth step creates a new "generation" of polymer with a larger molecular diameter, more active sites or end groups, and approximately double the molecular weight of the previous generation.

The synthetic procedures developed for dendrimer preparation permit nearly complete control over the critical molecular design parameters, such as size, shape, surface/interior chemistry, flexibility, and topology. Synthetic techniques that are well-known in the art include the Starburst divergent strategy, the convergent growth strategy, and the self-assembly strategy. These methods have proved effective in generating macromolecules with a unique combination of properties. For further details, see Holister et al. (2003) Dendrimers Technology White Papers, Nr. 6, Cientifica, Ltd.

In one embodiment of the present invention, the dendrimer surface or exterior is treated with acid so as to effectuate uniform dispersion of cation exchange resins and high proton conductivity. Typically, about 0.1-10 weight parts of nanoscopic dendrimers are used to produce a composite electrolyte membrane. With regard to size, since the proton channels in the cation exchange resin are typically 3 to 4 nm in diameter, it is preferred that the dendrimer is smaller in size, more preferably, 1 to 2 nm in diameter.

The location, nature, and conformational mobility of the terminal groups at the dendrimer exterior can determine a dendrimer's properties, e.g. solubility, chemical reactivity, etc. The present invention utilizes this principle by introducing various acid derivatives and/or functional groups to the terminal groups of a dendrimer to achieve the desired properties as will be explained below.

Aside from size considerations, any dendrimer can be used to achieve the object of the present invention. Preferably, the dendrimer is selected from a group consisting of: poly (amido-amine)(PAMAM) dendrimer, carboxylin dendrimer, polyphenylene dendrimer, phosphorus-containing dendrimer, etc. More preferably, the dendrimer is selected to be poly(amido-amine)(PAMAM) dendrimer. These dendrimers are commercially available and can be purchased through Sigma-Aldrich and other sources.

In one embodiment, the PAMAM dendrimers are synthesized by the divergent method from core molecules such as ammonia, ethylenediamine (EDA), or propylenediamine (PDA), etc. This method involves (a) a double Michael addition of methyl acrylate to a primary amino group followed by (b) amidation of the resulting carbomethoxy intermediate with a large excess of ethylenediamine. The PAMAM dendrimer is a nanoscopic, soluble molecule measuring 1 to 13 nm in radius, increasing about 1 nm per generation up to the tenth generation.

To treat the dendrimer surface, any acid may technically be employed. Preferably, the acid to be employed contains at least one functionality from the group consisting of carboxylic acid group, phosphoric acid group, and amine group. Dendrimers already functionalized with such groups, such as (COOH)— PAMAM, can be purchased from Dendritic NanoTechnologies Inc. or other commercial sources.

The dendrimer of the present invention can be used homogenously or heterogenously, i.e. as a combination of different dendrimer species. Preferably, 0.1 to 10 weight parts of dendrimers are added to every 100 weight parts of composite electrolyte membrane. More preferably, 1 to 5 weight parts of dendrimers are added to every 100 weight parts of composite electrolyte membrane. If dendrimer content falls below 0.1 weight parts, the distance between adjacent dendrimers becomes too great and proton transport, i.e. proton conductivity, is reduced. The reason for this lies in the different mechanisms by which proton transport is achieved in the present invention and in the prior art as represented by NAFION. In the present invention, proton conductivity is achieved through interface interaction between adjoining acid-treated dendrimers that are dispersed over the electrolyte membrane whereas proton conductivity in the prior art, as represented by NAFION, relies on water molecules that are immobilized over hydrophilic domains. On the other hand, dendrimer content in excess of 10 weight parts can damage the polymeric matrix and cause deformation of the hydrophilic domains. The appropriate quantity of dendrimers to employ will be readily perceived by those skilled in the art.

In one embodiment of the present invention, a method of preparing a composite electrolyte membrane is provided. Said method comprises the steps of: (1) dissolving a cation exchange material in an organic solvent to prepare a polymer solution;

(2) adding a dendrimer to the polymer solution; and (3) mixing the polymer solution and dendrimer by ultrasonic means to fabricate the composite electrolyte membrane.

It should be noted that the composite electrolyte membrane of the present invention is not limited to preparation by the method described above.

As used herein, a cation exchange resin is an ion exchange polymer having a cation exchange group as a side chain. Cation exchange resins are typically sold in a solubilized form in distilled water and alcohol, e.g. distilled water/2-propanol. To prepare the polymer solution mentioned above, the distilled water and alcohol, if they are present, are first evaporated from the solubilized cation exchange resin. The resin is then dissolved in an organic solvent to about a concentration of 0.5-30-wt % to produce the polymer solution.

While any organic solvent can in theory be used, preferably, the organic solvent is selected from one of the group consisting of 2-propanol (IPA), N-methyl-2-pyrrolidinone (NMP), dimethyl formamide (DMF), dimethyl acetamide (DMA), tetrahydrofuran (THF), dimethyl sulfoxide (DMSO), acetone, methyl ethyl ketone (MEK), tetramethylurea, trimethyl phosphate, butyrolactone, isophorone, carbitol acetate, methyl isobutyl ketone, N-butyl acetate, cyclohexanone, diacetone alcohol, diisobutyl ketone, ethyl acetoacetate, glycol ether, propylene carbonate, ethylene carbonate, dimethylcarbonate, diethylcarbonate or mixtures of two or more of the above.

In the second step, dendrimer is added to the polymer solution. Preferably, the dendrimer is selected from a group consisting of: poly(amido-amine)(PAMAM) dendrimer, carboxylin dendrimer, polyphenylene dendrimer, phosphorus-containing dendrimer, etc. More preferably, the dendrimer is selected to be poly(amido-amine)(PAMAM) dendrimer. The dendrimer of the present invention can be used homogenously or heterogenously, i.e. as a combination of different dendrimer species. The resulting solution is then mixed by ultrasonic means, coated on a glass plate and dried in an oven at approximately 100° C. Preferably, the ultrasonic means involve delivering ultrasonic pulses of 10-20 μm in amplitude at 400 to 1,500 W. The time of ultrasonic treatment can range from about 10 to 60 minutes. The frequency of ultrasonic waves to be applied is not limited specifically and can be varied accordingly by one of skill in the art. Movement of the dendrimers into NAFION channels is thereby facilitated, thereby producing the composite electrolyte membrane of the present invention.

Preferably, the composite electrolyte membrane undergoes a process to remove any impurities, e.g. porogens. In one embodiment, the membrane is placed in a solvent and stirred for more than 24 h., then dried and washed. Preferably, the solvent used in this purification process is selected from one of the group consisting of acetone, methanol, ethanol, dimethyl ether, diethyl ether or mixtures thereof, i.e. mixtures of two or more from the list above.

The following examples are provided by way of illustration only and not by way of limitation. Those of skill in the art will readily recognize a variety of non-critical parameters that could be changed or modified to yield essentially similar results.

EXAMPLES

Example 1

Preparing a Composite Electrolyte Membrane of the Present Invention

First, 100 g of 5 wt % NAFION/$H_2O$/2-propanol solution (purchased from Dupont Co. Ltd.; NAFION 117, surface-treated with carboxylic acid; EW=1,100) was stirred at room temperature for 48 h. The water and alcohol are removed by evaporation, leaving about 5 g of NAFION gel. Then, 95 g of dimethylacetamide (DMA) was added to prepare about 5-wt % NAFION/DMA solution. The resulting solution was reserved at 60° C. for 24 h. in a hot water bath to evaporate any water remaining. Then, 0.1 g of PAMAM dendrimer was added to 100 g of 5-wt % NAFION/DMA solution and mixed by ultrasonic pulse (15 μm of amplitude, 1,000 W). The resulting solution was coated on a glass plate and heated for 12 h. in an oven set at about 100° C. to prepare a polymer membrane measuring about 50 μm in thickness. As used herein, EW (equivalent weight) defines the molecular weight of a mass surrounding S.

Example 2

Preparing a NAFION Membrane

NAFION 117 (EW=1; 100-180 μm in thickness) manufactured by Dupont Co. Ltd. was treated in a hydrogen peroxide solution at 100° C. for 3 h. to remove contaminants on the surface of NAFION 117, then treated at 100° C. with 1 M of sulfuric acid solution for 2 h. and stored in deionized water. The physical property of NAFION 117 prepared above was evaluated by the same procedure as described in Example.

Example 3

Measurement of Hydrogen Ion Conductivity in Composite Electrolyte Membrane

Figure 3:
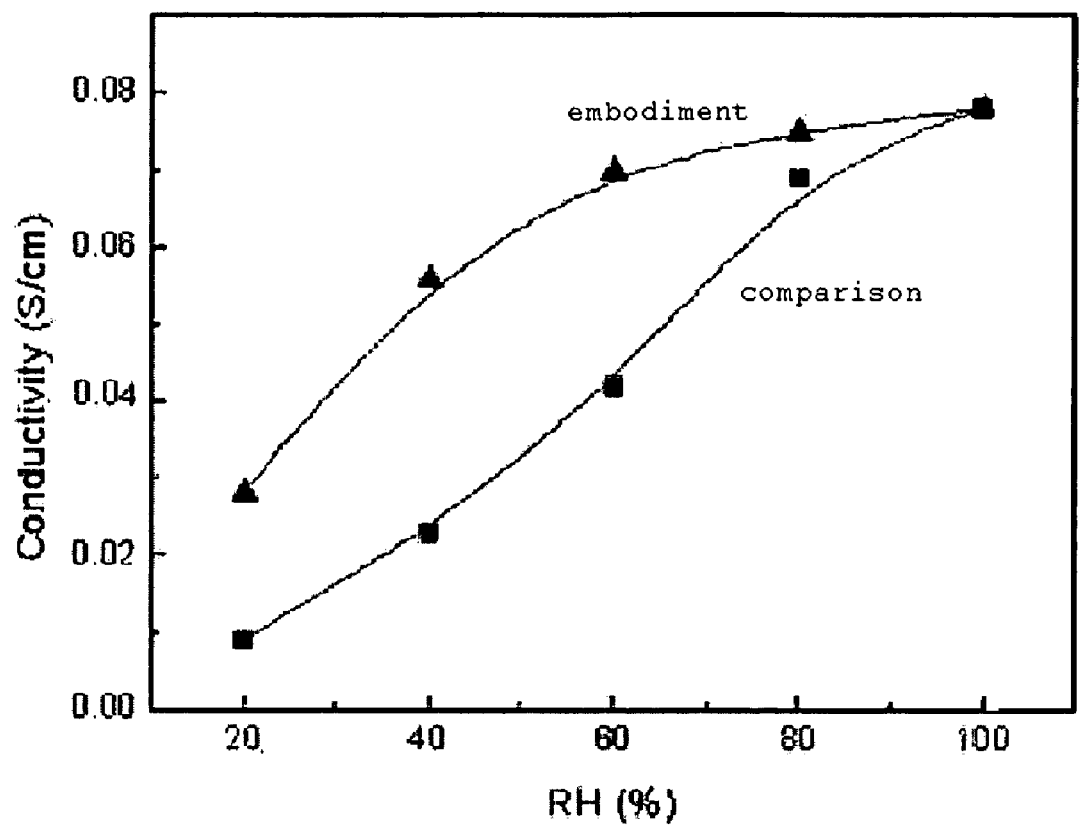
FIG. 3 is a graph comparing the ion conductivity of an electrolyte membrane of the present invention and a commercially available NAFION 117 membrane at different relative humidities.

The proton conductivity of the composite electrolyte membrane produced in Example 1 was measured by current interruption. The test membrane, measuring 1-5 $cm^2$ and 30-50 μm in thickness, was placed in a temperature and humidity-controlled chamber and subjected to a constant alternating current at both ends. The difference in potentials generated from the center was examined to measure the proton conductivity of the test membrane. The results are shown in FIG. 3.

Example 4

Measurement of Ion conductivity at Different PAMAM Content

Figure 4:
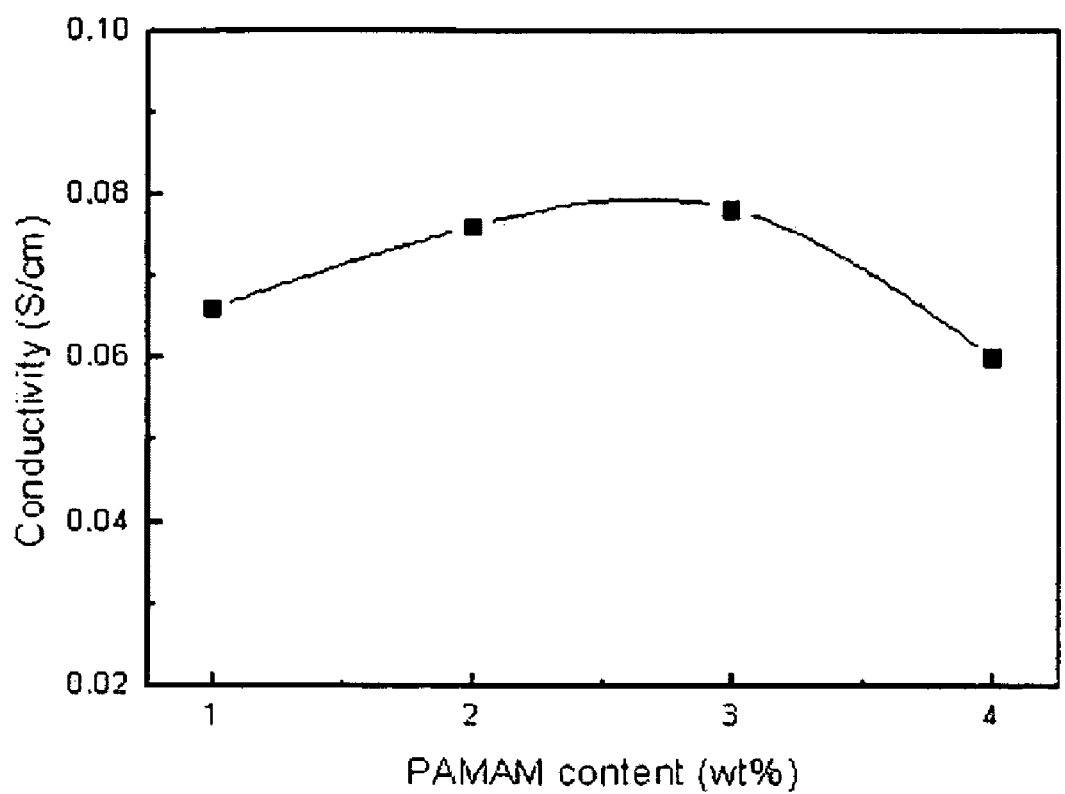
FIG. 4 is a graph of ion conductivity vs. PAMAM content in 60% humidity.

The proton conductivity of the composite electrolyte membrane was then measured with respect to PAMAM content. To maintain a constant temperature and humidity during the measurements, a closed chamber with a mechanism for temperature control was prepared. The chamber was adjusted by the ratio of dry nitrogen and humid nitrogen to fix the humidity at 60%. The test electrolyte membrane was placed in the chamber to measure the proton conductivity by the procedure described in Example 3. The results are shown in FIG. 4.

Example 5

Measurement of Permeability in Composite Electrolyte Membrane

Figure 5:
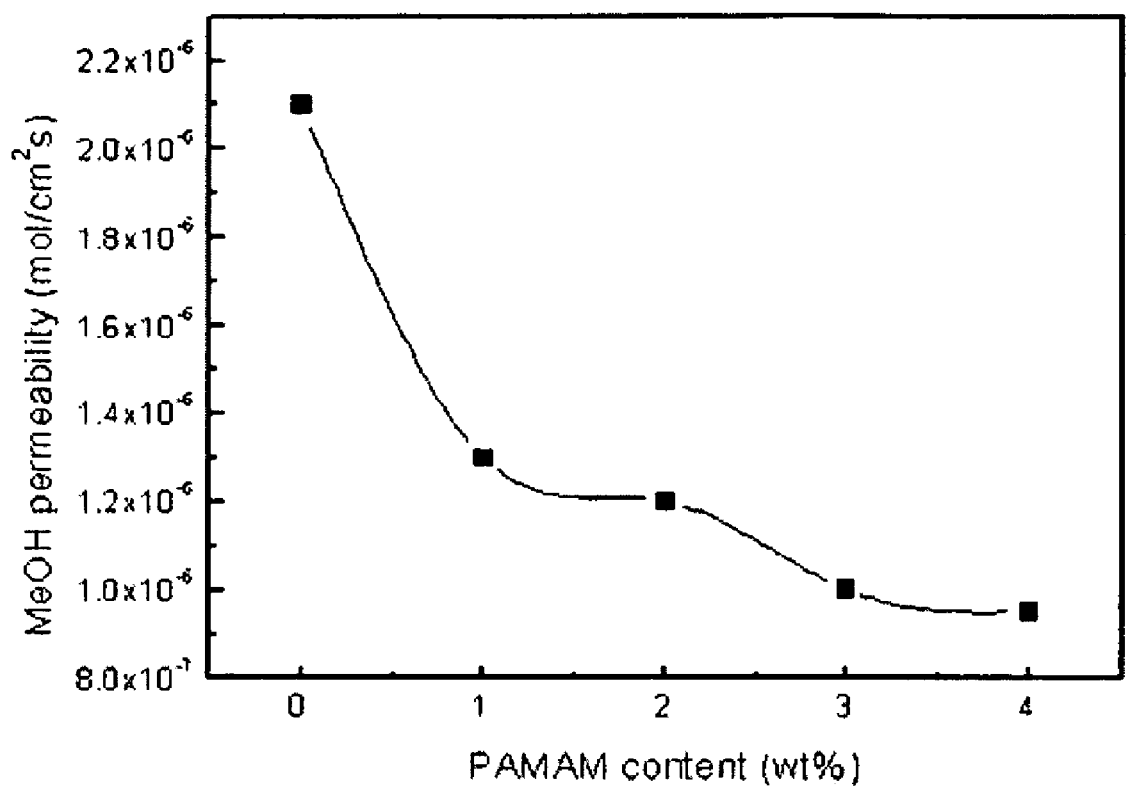
FIG. 5 is a graph of methanol permeability of membranes vs. PAMAM content.

To measure the permeability of composite electrolyte membranes prepared in Examples 1 and 2, the difference in the reflective indices of water and methanol was utilized to measure the membrane permeability of methanol. A diffusion cell was constructed to hold pure water at one side and 2 M methanol solution at the other side. A composite electrolyte membrane was inserted in the central region to calculate the volume of methanol that permeated through the membrane by using an apparatus for measuring reflective index. The results are shown in FIG. 5.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth herein.

What is claimed is:

1. A composite electrolyte membrane comprising:
   a) a cation exchange resin, wherein the cation exchange material is a compound containing at least one of the group consisting of sulfonic acid group, carboxylic acid group, phosphoric acid group, phosphonyl acid group, or derivatives thereof;
   b) an acid-treated dendrimer, wherein the dendrimer is selected from one of the group consisting of poly(amido-amine)(PAMAM) dendrimer, carboxylin dendrimer, polyphenylene dendrimer, or phosphorus-containing dendrimer.

2. The composite electrolyte of claim 1, wherein the cation exchange resin is a polymer.

3. The composite electrolyte of claim 1, wherein the cation exchange material is comprised by about 100 weight parts and the acid-treated dendrimer is comprised by about 0.1 weight parts to 10 weight parts.

4. The composite electrolyte membrane of claim 1, wherein the cation exchange material is a compound having a structure according to the following formula:

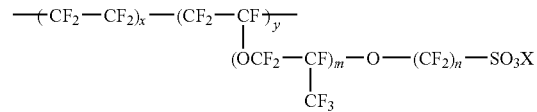

wherein X is H, Li, Na, K or $NR_1R_2R_3R_4$; $R_1$, $R_2$, $R_3$, and $R_4$ are H, $CH_3$, or $C_2H_5$ independently; m is 1-3; n is 2; x is 5-13.5; and y is 700-1,500.

5. The composite electrolyte membrane of claim 1, wherein the acid is carboxylic acid or phosphoric acid.

6. A method of fabricating a composite electrolyte membrane, comprising the steps of:
   (a) dissolving a cation exchange material in an organic solvent to prepare a polymer solution;
   (b) adding an acid-treated dendrimer to the polymer solution; and
   (c) mixing the polymer solution and the dendrimer by ultrasonic means to fabricate the composite electrolyte membrane.

* * * * *